United States Patent
Shibazaki

[19]

[11] Patent Number: 5,513,300
[45] Date of Patent: Apr. 30, 1996

[54] METHOD AND APPARATUS FOR PRODUCING OVERLAPPING IMAGE AREA

[75] Inventor: Hiroshi Shibazaki, Kyoto, Japan

[73] Assignee: Dainippon Screen Mfg. Co., Ltd., Japan

[21] Appl. No.: 114,666

[22] Filed: Aug. 31, 1993

[30] Foreign Application Priority Data

Sep. 30, 1992 [JP] Japan .................. 4-286890

[51] Int. Cl.[6] ................. G06K 15/00; G06T 11/00
[52] U.S. Cl. ............. 395/112; 395/109; 395/135; 395/101
[58] Field of Search ................ 395/112, 109, 395/131, 135, 162, 101; 382/16, 65, 9, 19, 56, 54, 57

[56] References Cited

U.S. PATENT DOCUMENTS

| | | | |
|---|---|---|---|
| 5,091,974 | 2/1992 | Sasahara et al. | 382/55 |
| 5,146,511 | 9/1992 | Shiraski | 382/21 |
| 5,251,022 | 10/1993 | Kitamura | 358/528 |
| 5,255,354 | 10/1993 | Mahoney | 395/133 |
| 5,263,095 | 11/1993 | Kitamura | 382/9 |
| 5,283,840 | 2/1994 | Kitamura et al. | 382/16 |
| 5,313,570 | 5/1994 | Dermer et al. | 395/131 |
| 5,388,204 | 2/1995 | Ikeda et al. | 395/162 |
| 5,398,309 | 3/1995 | Atkins et al. | 395/133 |
| 5,438,651 | 8/1995 | Suzuki et al. | 395/131 |

FOREIGN PATENT DOCUMENTS

| | | |
|---|---|---|
| 422602 | 10/1990 | European Pat. Off. . |
| 484890 | 5/1991 | European Pat. Off. . |
| 503606 | 3/1992 | European Pat. Off. . |

Primary Examiner—Raymond J. Bayerl
Assistant Examiner—Tracy M. Legree
Attorney, Agent, or Firm—Ostrolenk, Faber, Gerb & Soffen

[57] ABSTRACT

An overlapping image area is generated on a boundary between a linework image and a picture image by processing one-page linework data and one-page picture data previously prepared without the overlapping process. The overlapping process includes an outer mode and inner mode. In the outer mode, the linework data is corrected such that an overlapping image area is produced in an effective linework area of the one-page linework image, and the picture data is corrected such that an effective picture area is expanded in the one-page picture image. The corrected picture data and corrected linework data are then combined with each other to form a final composite image.

15 Claims, 18 Drawing Sheets

Fig. 3(A) LINEWORK IMAGE    Fig. 3(B) PICTURE IMAGE
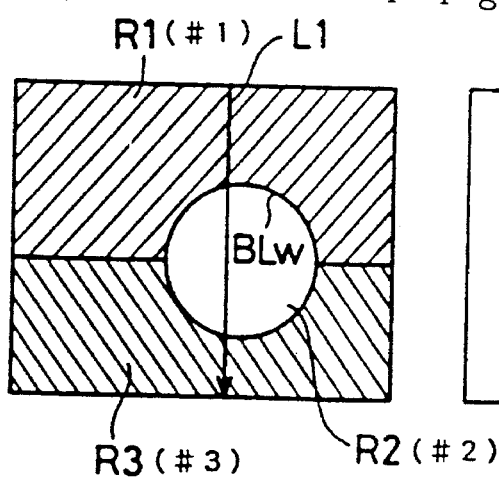 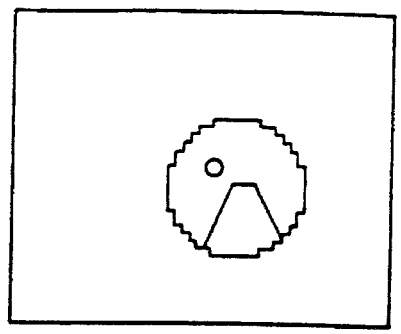
Fig. 3(C) COMPOSITE IMAGE
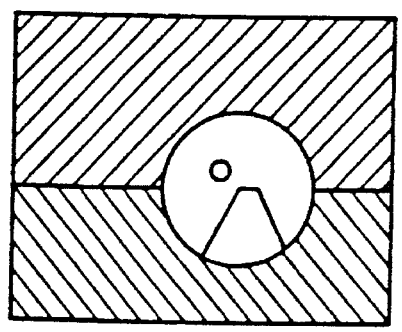

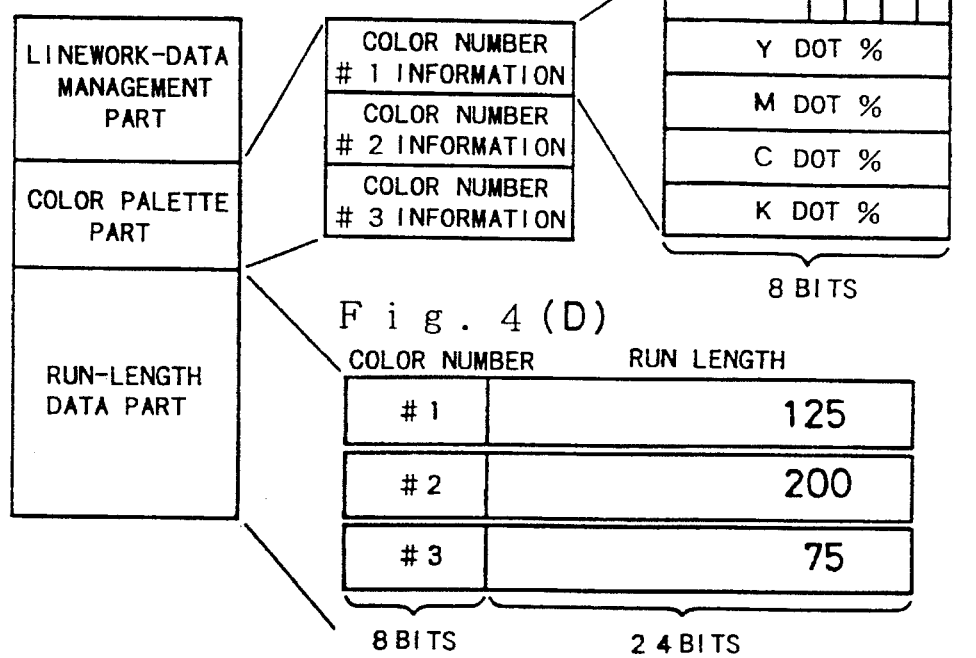

Fig. 6 (A) PICTURE DATA
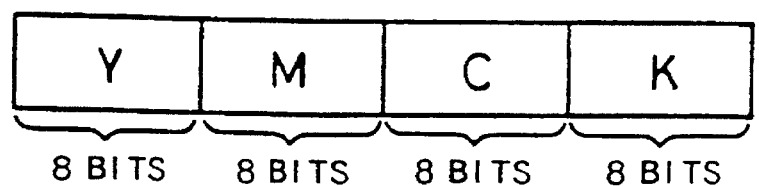
Fig. 6 (B) ARRANGEMENT
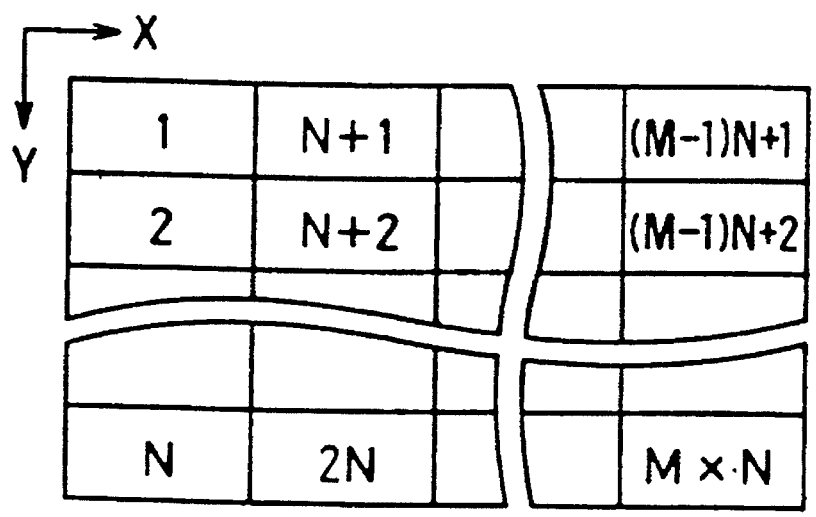

Fig. 9(A)

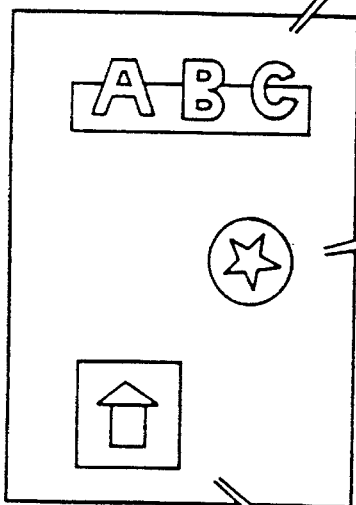

Fig. 9(B) LINEWORK/LINEWORK

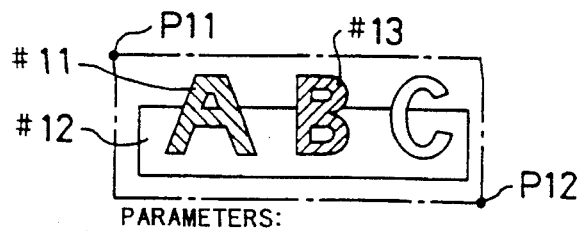

PARAMETERS:
(1) COORDINATES OF POINTS P11 AND P12
(2) DATA INSTRUCTING PRODUCTION OF OVERLAPPING IMAGE AREA ON BOUNDARY BETWEEN COLOR NUMBERS #11 AND #12
(3) OVERLAPPING WIDTH (NUMBER OF PIXELS)

Fig. 9(C) LINEWORK/PICTURE(OUTER MODE)

PARAMETERS:
(1) COORDINATES OF POINTS P21 AND P22
(2) OVERLAPPING-PROCESS MODE (OUTER)
(3) OVERLAPPING WIDTH
(4) NON-TARGET COLORS OF OVERLAPPING PROCESS

Fig. 9(D) LINEWORK/PICTURE(INNER MODE)

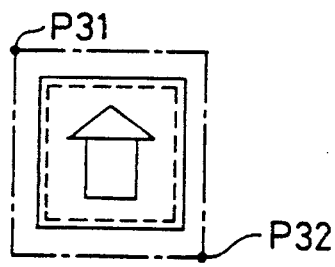

PARAMETERS:
(1) COORDINATES OF POINTS P31 AND P32
(2) OVERLAPPING-PROCESS MODE (INNER)
(3) OVERLAPPING WIDTH
(4) NON-TARGET COLORS OF OVERLAPPING PROCESS

R2(I/I/I/I)

N=5

N=5    R3(0/0/0/100)

0

1

PROCESS OF EXPANDING PICTURE IMAGE
Fig. 11(A) LINEWORK IMAGE
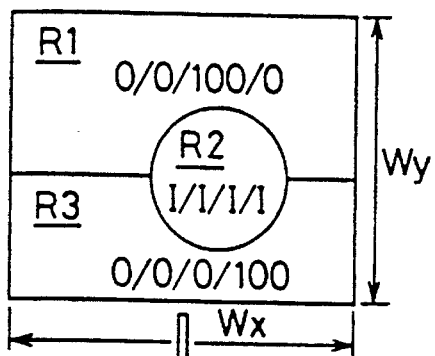
Fig. 11(B) MASK LINEWORK IMAGE    Fig. 11(C) PICTURE IMAGE
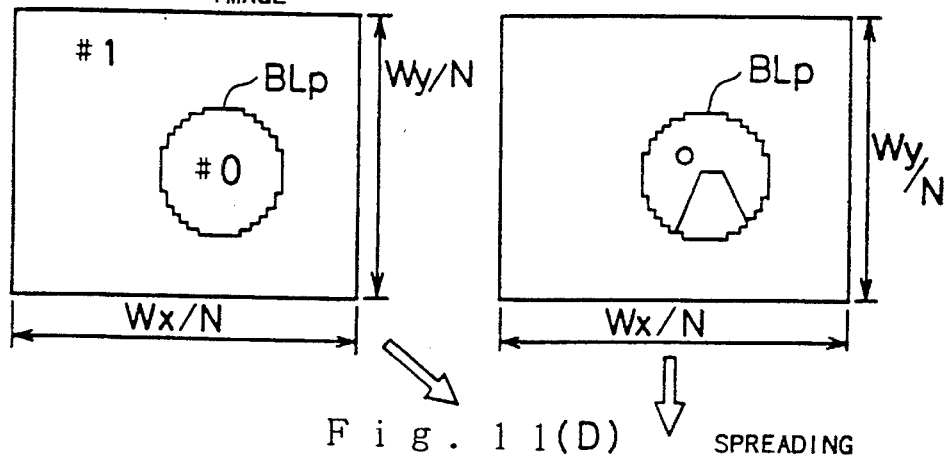
Fig. 11(D) SPREADING
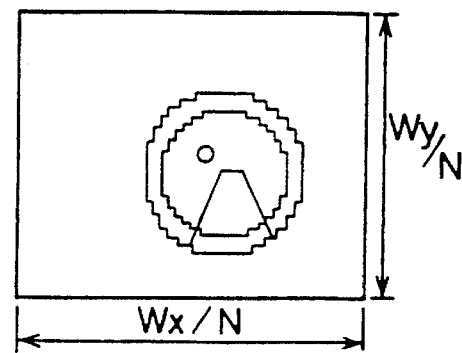

Fig. 13(A) 8-NEIGHBOUR WINDOW

|   |   | EW |
|---|---|---|
| 5 | 3 | 6 |
| 1 | CP | 2 |
| 7 | 4 | 8 |

Fig. 13(B) MASK LINEWORK PIXELS

| #1 | #1 | #1 | #1 | #1 |
|---|---|---|---|---|
| #1 | #1 | #1 | #0 | #0 |
| #1 | #1 | #0 | #0 | #0 |
| #1 | #0 | #0 | #0 | #0 |
| #1 | #0 | #0 | #0 | #0 |

EW, BLp

Fig. 13(C) PICTURE PIXELS

EW, BLp

Fig. 14(A) LINEWORK IMAGE
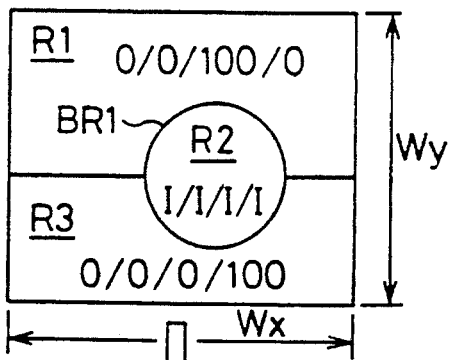
EXPANSION OUTER MODE   INNER MODE CONTRACTION
Fig. 14(B) 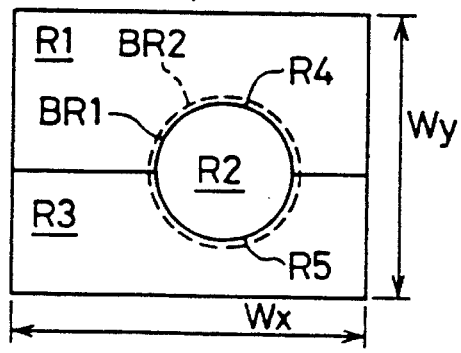   Fig. 14(C) 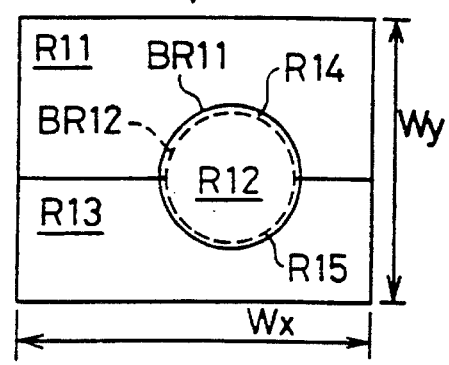

OVERLAPPING PROCESS OF LINEWORK IMAGE IN OUTER MODE

Fig. 15(E) COLOR PALETTE CP

| AREA | COLOR NUMBER | Y | M | C | K |
|---|---|---|---|---|---|
| R1: | #1 | 0 | 0 | 100 | 0 |
| R2: | #2 | I | I | I | I |
| R3: | #3 | 0 | 0 | 0 | 100 |
| R4: | #4 | I | I | 100 | 0 |
| R5: | #5 | I | I | 0 | 100 |

OVERLAPPING PROCESS OF LINEWORK IMAGE IN INNER MODE

Fig. 16 (E) COLOR PALETTE CP

|  | COLOR NUMBER | Y | M | C | K |
|---|---|---|---|---|---|
| AREA R11: | #11 | 0 | 100 | 0 | 0 |
| R12: | #12 | I | I | I | I |
| R13: | #13 | 100 | 0 | 0 | 0 |
| R14: | #14 | 0 | 100 | I | I |
| R15: | #15 | 100 | 0 | I | I |

PRIOR ART
Fig. 18 (A) WITHOUT OVERLAPPING IMAGE AREA
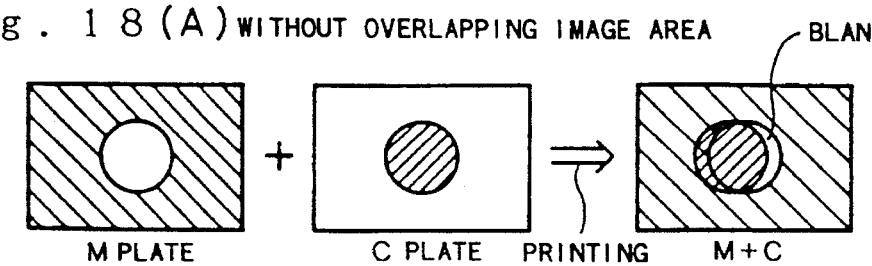
Fig. 18 (B) WITH OVERLAPPING IMAGE AREA
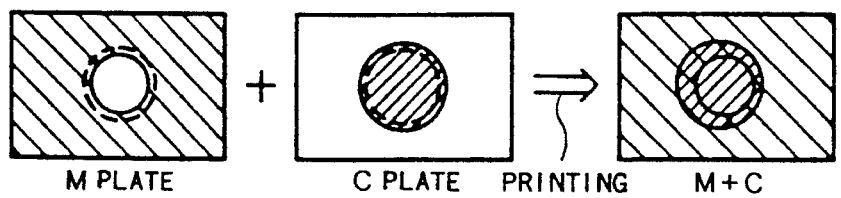
Fig. 18 (C) WITH SIMILAR DENSITY GRADATIONS (WITHOUT OVERLAPPING IMAGE AREA)
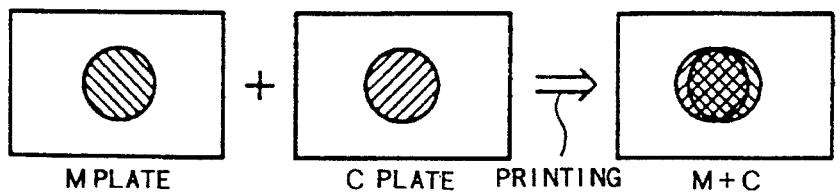

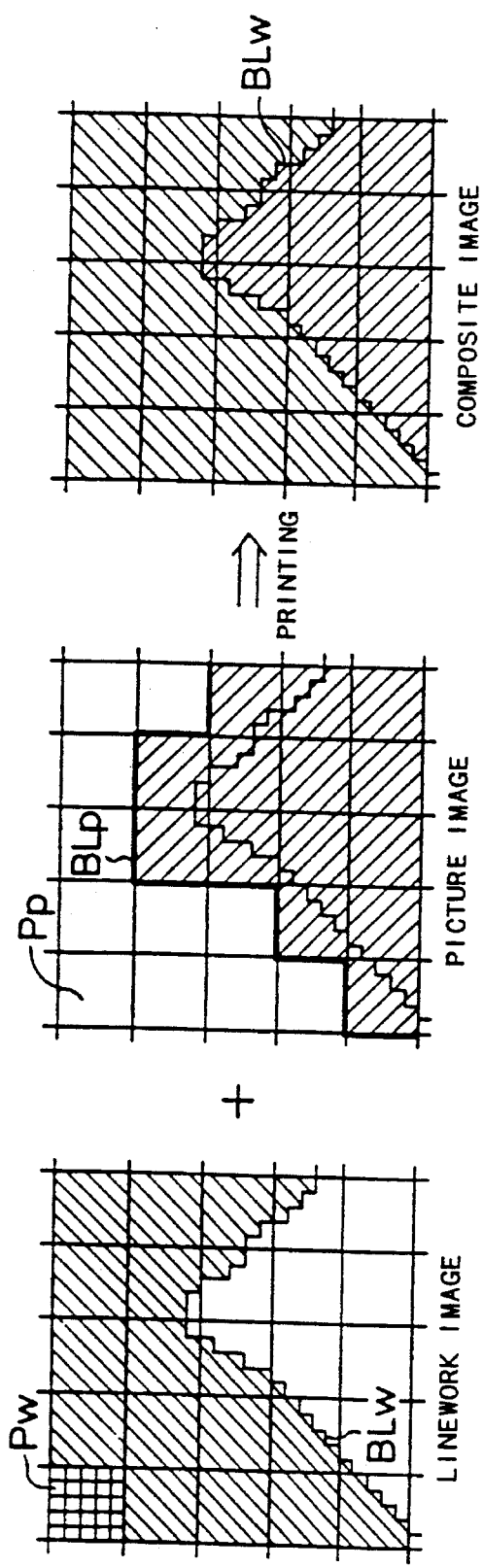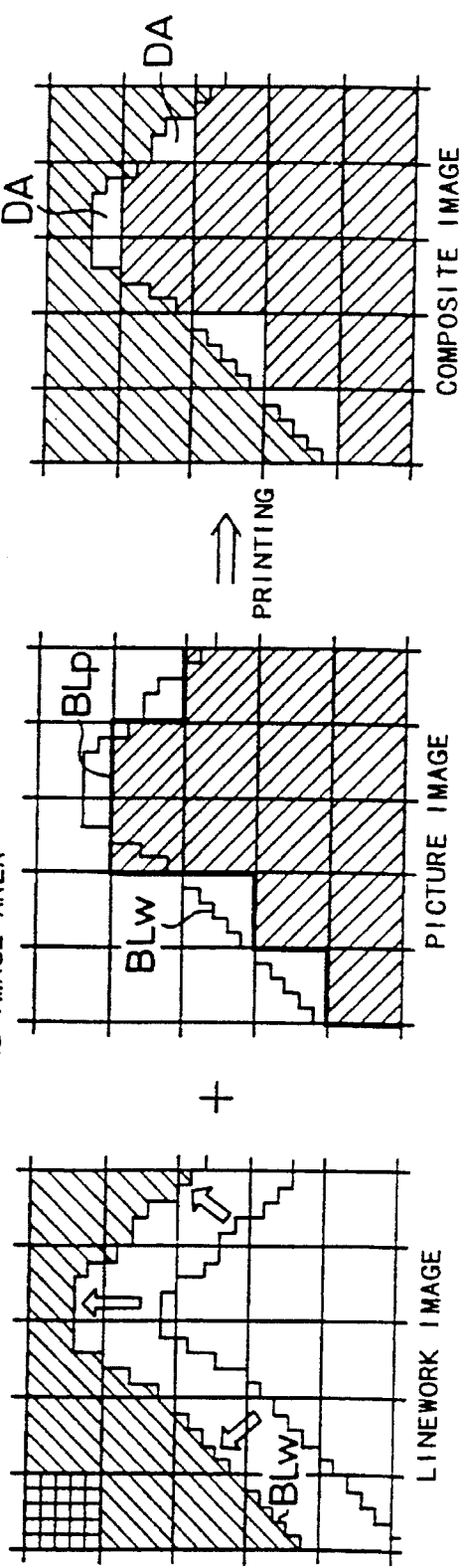
Fig. 19(A) WITHOUT OVERLAPPING IMAGE AREA (PRIOR ART)
Fig. 19(B) WITH OVERLAPPING IMAGE AREA

METHOD AND APPARATUS FOR PRODUCING OVERLAPPING IMAGE AREA

BACKGROUND OF THE INVENTION

1. Field of the Invention

The present invention relates to a method and an apparatus for processing linework data representing a one-page color linework image and picture data representing a one-page color picture image to produce an overlapping image area on a boundary between the linework image and the picture image, thereby generating a one-page color composite image including the linework image and the picture image.

2. Description of the Related Art

In a color printing process, printing plates for four color inks, that is, Y (yellow), M (magenta), C (cyan), and K (black), are usually prepared in the first place. The four printing plates are then mounted on a color printing machine to produce color prints. Although the color printing machine is highly accurate and precise, in an actual color printing process a registering mismatch of approximately +0.05 mm among the printing plates is sometimes observed. The registering mismatch causes a blank portion to be formed which is not filled with ink. FIG. 18(A) shows a typical example of a blank portion caused by the registering mismatch. Such a blank portion is conspicuous and therefore deteriorates the quality of the printed matter.

Overlapping images is a known technique which is generally applied in the prepress process to prevent the deterioration of the print quality due to the registering mismatch. In the overlapping process, an additional image area of a substantially constant width (hereinafter referred to as the overlapping image area) is produced on a boundary between two image areas adjacent to each other by correcting the shape of these two image areas. The color of the overlapping image area is determined so as to make the overlapping image area inconspicuous when printed. FIG. 18(B) shows an example of registering mismatch where an overlapping image area is produced between images of a M(magenta) color plate and a C(cyan) color plate. As clearly seen in FIG. 18(B), the overlapping process effectively prevents the formation of an undesirable blank portion due to the registering mismatch.

The overlapping process is required when two image areas on different color plates, for example, M and C plates, have opposite density gradations across a boundary between the image areas. In the example of FIG. 18(A), the density of the image area on the M plate is higher at the outside of the boundary and lower at the inside while the density of the image area on the C plate is higher at the inside of the boundary and lower at the outside.

By contrast, when two image areas of different color plates have similar density gradations as shown in FIG. 18(C), registering mismatch does not cause a conspicuous blank portion and the overlapping process might not be necessary.

A variety of methods have been proposed to automatically execute the overlapping process with the aid of an image processing apparatus. The conventional overlapping process produces an overlapping image area on a boundary between two linework images or between two picture images. No method has, however, been proposed for automatically producing an overlapping image area on a boundary between a linework image and a picture image. This is partly attributable to different resolutions of linework data and picture data as well as their different data formats. Further, since the color in a picture image varies for each pixel, it is difficult to determine the color of an overlapping image area even if the overlapping image area can be produced on the boundary between a linework image and a picture image.

When linework data and picture data have previously been made to represent a one-page composite image, the following problems have also arisen. FIG. 19(A) shows the production of a composite image from one-page linework data and one-page picture data. The linework data has an effective linework area, which is filled with rightward-ascent slant lines, on one side of a first boundary BLw in FIG. 19(A), whereas the picture data has an effective picture area, which is filled with leftward-ascent slant lines, on the other side of a second boundary BLp. The ratio of the size of a linework pixel Pw to that of a picture pixel Pp is one to five. In other words, the resolution of the linework image is five times greater than that of the picture image. The boundary BLw of the linework image is represented by the boundary BLp of the picture image if the boundary BLw is expressed at the resolution of the picture image. The boundary BLp of the picture image is defined by a contour of the picture pixels which include the boundary BLw of the linework image.

A composite image is obtained by combining the linework image and the picture image along the boundary BLw of the linework image as clearly seen in FIG. 19(A). When a conventional overlapping process is executed for linework data to shift the boundary BLw of the linework image in the direction toward the effective linework area as shown in FIG. 19(B), blank portions DA are formed on the boundary between the linework image and the picture image in the composite image.

SUMMARY OF THE INVENTION

An object of the invention is to produce an overlapping image area on a boundary between a linework image and a picture image by processing a one-page linework data and a one-page picture data.

The present invention is directed to a method of processing linework data representing a one-page color linework image and picture data representing a one-page color picture image to produce a one-page composite image where the linework image and the picture image overlap at least partly with each other. The method comprises the steps of: (a) preparing linework data representing a one-page color linework image at a first resolution, the one-page color linework image having an effective linework area on one side of a first boundary and a picture pasting area on the other side of the first boundary, wherein a picture image has priority over a linework image in the picture pasting area; (b) preparing picture data representing a one-page color picture image at a second resolution lower than the first resolution, the one-page color picture image having an effective picture area on one side of a second boundary, the second boundary corresponding to the first boundary, the effective picture area corresponding to the picture pasting area in the one-page color linework image; (c) correcting the picture data to expand the effective picture area by a predetermined first width; (d) correcting the linework data to expand the picture pasting area by a predetermined second width; and (e) recording a plurality of halftone images of the one-page color composite image as a function of the corrected picture data and the corrected linework data.

Preferably, the method further comprises the steps of: (f) preparing mask image data representing a mask image, the mask image data indicating the second boundary in the one-page picture image at the second resolution; and wherein the step (c) comprises the steps of: (c-1) comparing the mask image data and the picture data to find density of a plurality of color components inside the second boundary; and (c-2) correcting the picture data by copying the density of a first picture pixel inside the second boundary to a second picture pixel outside the second boundary along the entirety of the second boundary such that the effective picture area is expanded.

In the preferred embodiment of the present invention, the step (c) further comprises the steps of: (c-3) correcting the mask image data such that the second boundary is expanded by the same amount as the expansion of the effective picture area at the step (c-2); and (c-4) repeating the steps (c-1) through (c-3) to expand the effective picture area by the first width.

The step (f) comprises the step of: (f-1) reducing the linework data from the first resolution to the second resolution to produce the mask image data.

According to an aspect of the present invention, the mask image data has a first color number at each pixel on one side of the second boundary corresponding to the effective picture area in the one-page color picture image, and a second color number at each pixel on the other side of the second boundary; and the step (c-1) comprises the steps of: virtually moving a window on the mask image one pixel at a time and simultaneously on the one-page color picture image, the window having a central pixel and eight neighbor pixels surrounding the central pixel; finding a pixel in the mask image where the first color number is allocated to the central pixel and the second color number is allocated to at least one of the eight neighbor pixels; and copying the density of the plurality of color components of the first picture pixel to the second picture pixel, wherein the first picture pixel corresponds to the one of the eight neighbor pixels to which the second color number is allocated, and wherein the second picture pixel corresponds to the central pixel of the window.

According to still another aspect of the present invention, the method further comprises the steps of: (g) selecting at least one target color component out of the plurality of color components; and wherein the step (d) comprises the step of: (d-1) correcting the target color component of the linework data such that the target color component of the effective linework image area remains intact in an overlapping area which is covered by the expanded picture pasting area.

In the preferred embodiment of the present invention, the first width is no less than the second width.

The present invention is also directed to a method comprising the steps of: (a) preparing linework data representing a one-page color linework image at a first resolution, the one-page color linework image having an effective linework area on a first side of a first boundary, the linework data including image-representation data indicating a plurality of color components at each linework pixel in the linework image, the linework data further including priority data indicating which of a picture image and the linework image has priority at each pixel of the linework image; (b) preparing picture data representing a one-page color picture image at a second resolution lower than the first resolution, the one-page color picture image having an effective picture area on a second side of a second boundary, the second boundary corresponding to the first boundary, the second side of the second boundary corresponding to a second side of the first boundary, the picture data including the plurality of color components at each picture pixel in the one-page color picture image; (c) selecting one of a first overlapping direction and a second overlapping direction, the first overlapping direction indicating that an overlapping image area is produced in the effective linework area, the second overlapping direction indicating that the overlapping image area is produced in the effective picture area, and selecting at least one target color component out of the plurality of color components; (d) correcting the picture data to expand the effective picture area by a predetermined first width when the second overlapping direction is selected at the step (c); (e) correcting the image-representation data of the linework data to produce an overlapping image area of a predetermined second width at the first resolution, the overlapping image area extending from the first boundary in the overlapping direction selected in the step (c); (f) updating the priority data such that the linework image has priority over the picture image for the target color component in the overlapping image area while the picture image has priority over the linework image for the other color components other than the target color component in the overlapping image area; and (g) combining the image-representation data with the picture data at a predetermined resolution no less than the first resolution while referring to the priority data updated in the step (f), to thereby record a plurality of halftone images of the one-page color composite image.

The present invention is further directed to an apparatus for processing linework data representing a one-page color linework image and picture data representing a one-page color picture image to produce a one-page composite image where the linework image and the picture image overlap at least partly with each other, the apparatus comprising: a first memory for memorizing linework data representing a one-page color linework image at a first resolution, the one-page color linework image having an effective linework area on one side of a first boundary and a picture pasting area on the other side of the first boundary, wherein a picture image has priority over a linework image in the picture pasting area; a second memory for memorizing picture data representing a one-page color picture image at a second resolution lower than the first resolution, the one-page color picture image having an effective picture area on one side of a second boundary, the second boundary corresponding to the first boundary, the effective picture area corresponding to the picture pasting area in the one-page color linework image; first correcting means for correcting picture data to expand the effective picture area by a predetermined first width; second correcting means for correcting the linework data to expand the picture pasting area by a predetermined second width; and recording scanner for recording a plurality of halftone images of the one-page color composite image as a function of the corrected picture data and the corrected linework data.

These and other objects, features, aspects, and advantages of the present invention will become more apparent from the following detailed description of preferred embodiments with the accompanying drawings.

BRIEF DESCRIPTION OF THE DRAWINGS

FIGS. 3(A), 3(B), and 3(C) respectively show a linework image, a picture image, and a composite image obtained by combining the linework image with the picture image;

FIGS. 4(A) through 4(D) show contents of processed linework data;

FIG. 5 shows a typical example of a color palette;

FIGS. 6(A) and 6(B) show a structure of picture data;

FIGS. 9(A) through 9(D) show overlapping-process parameters corresponding to combinations of adjacent image elements;

FIGS. 11(A) through 11(D) illustrate s process of expanding a picture image;

FIGS. 13(A) through 13(C) also show a method of expanding a picture image;

FIGS. 14(A) through 14(C) show two modes for an overlapping process of a linework image;

FIGS. 15(A) through 15(E) show a method of determining color data of overlapping image areas in the outer mode of FIGS. 14(A)–(C);

FIGS. 18(A) through 18(C) show the effect of an overlapping process according to a conventional method; and FIGS. 19(A) and 19(B) respectively show composite images without and with a blank portion according to a conventional method.

DESCRIPTION OF THE PREFERRED EMBODIMENT

Figure 1:
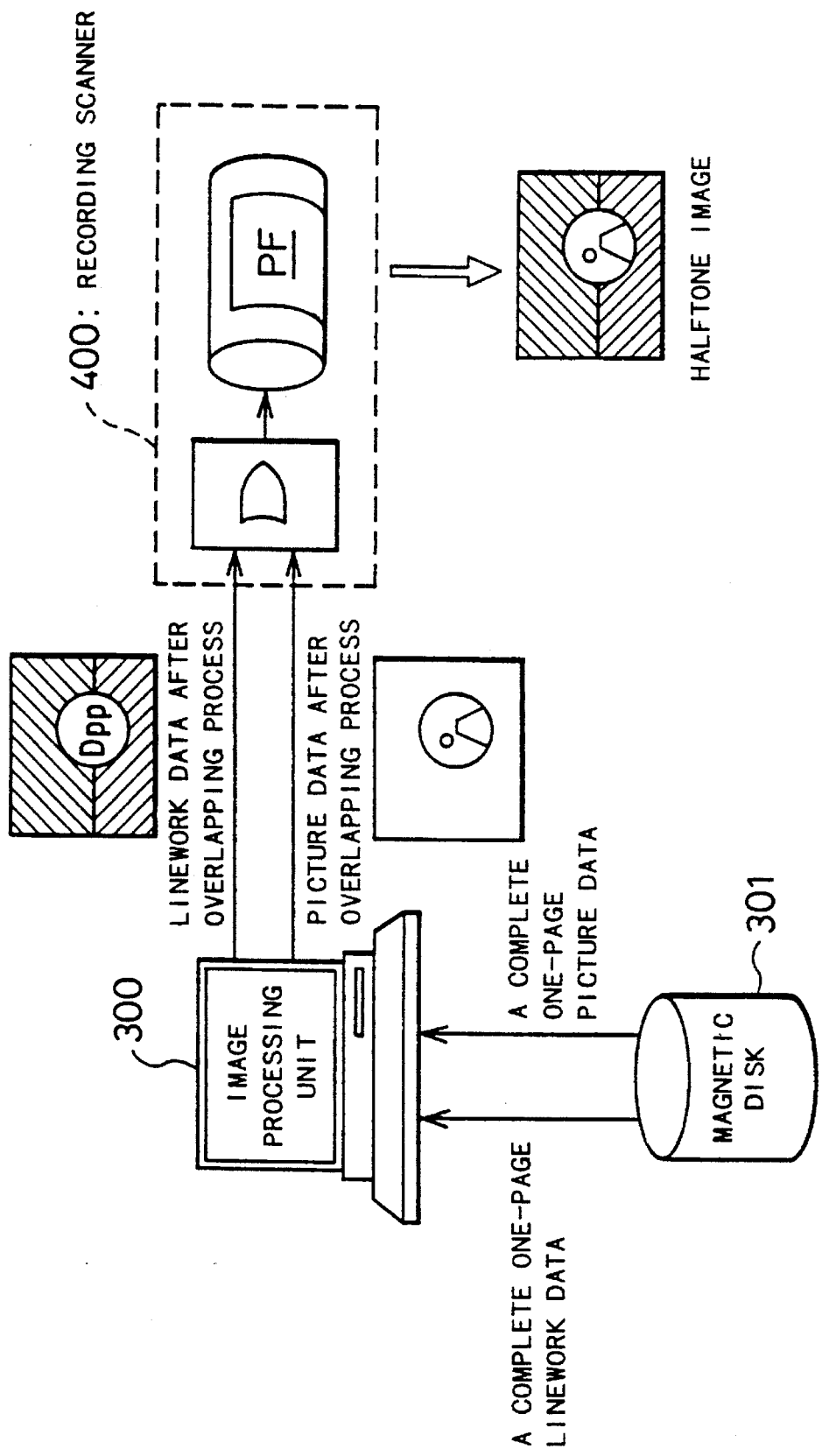
FIG. 1 is a schematic view showing a general structure of an image processing system for executing overlapping process embodying the invention.

FIG. 1 shows the general structure of an image processing system for executing the overlapping process according to the present invention. The image processing system is provided with an image processing unit 300, a magnetic disk 301 connected to the image processing unit 300, and a recording scanner 400.

The image processing unit 300 executes the overlapping process based on linework data and picture data stored in the magnetic disk 301. Details of the image processing unit 300 will be described later.

The recording scanner 400 combines linework data and picture data after the overlapping process and records one-page composite images as a set of halftone images on a photosensitive film PF. The halftone images are color-separated images of the one-page composite image for respective colors, for example, yellow (Y), magenta (M), cyan (C), and black (K).

Figure 2:
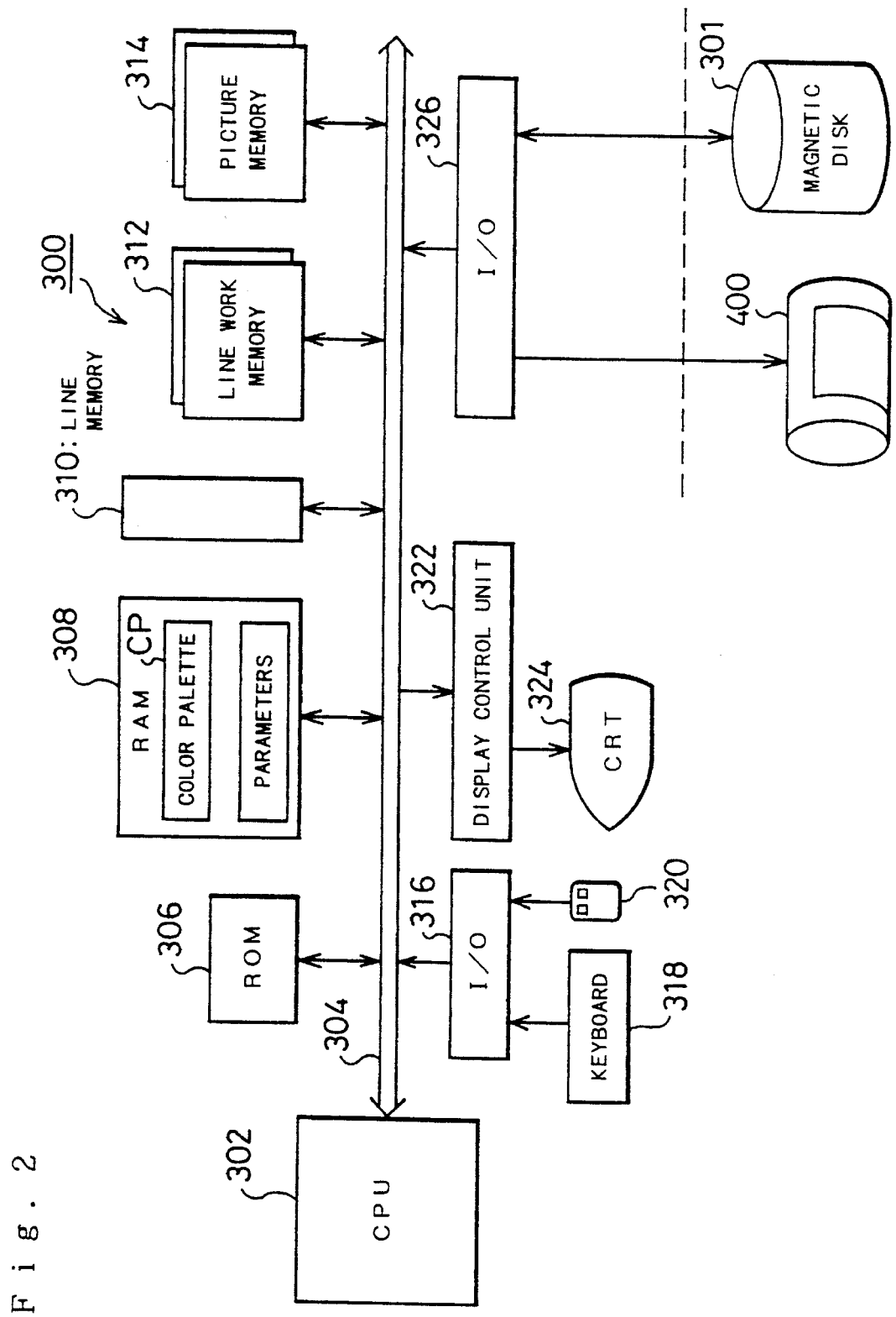
FIG. 2 is a block diagram showing an internal structure of the image processing unit 300 of FIG. 1.

FIG. 2 is a block diagram showing the internal structure of the image processing unit 300, which includes the following elements:

(a) CPU (Central Processing Unit) 302: The CPU 302 controls various elements in the image processing unit 300 and executes the image processing on the linework data and the picture data. The other constituents of the image processing unit 300 are all connected to the CPU 302 via a bus 304.

(b) ROM (Read Only Memory) 306: The ROM 306 stores processing programs executed by the CPU 302.

(c) RAM (Random Access Memory) 308: The RAM 308 temporarily stores a variety of data required in the image processing, which include various parameters like an image data size, a picture offset, an overlapping-process mode (described later) and a color palette (described later). The color palette includes a table showing a relationship between color numbers allocated to image areas in a linework image and color data indicating dot percents of the four colors.

(d) Line memory 310: The line memory 310 stores part of linework image data required at an expansion process and a contraction process for the linework data.

(e) Linework memory 312: The linework memory 312 stores linework image data representing the linework images before and after the overlapping process. The CPU 302 uses the linework memory 312 when executing a variety of image processing steps such as expansion, contraction, coloring, skipping, and enlarging. The linework memory 312 includes a plurality of memory planes each storing a one-page linework image data. In each image processing, two memory planes are used for storing a source image (an image before the processing) and a destination image (an image after the processing). Another memory plane is used for generating a mask which is used for expanding a picture image.

(f) Picture memory 314: The picture memory 314 includes a plurality of memory planes each storing one-page picture data as bit map data.

(g) Keyboard I/O interface 316: The keyboard I/O interface 316 receives input from a keyboard 318 and a mouse 320.

(h) Display control unit 322: The display control unit 322 transfers image data to a color CRT (Cathode Ray Tube) 324 to display an image as a function of the image data. The CPU 302 skips linework data to generate bit map data of a skipped linework image, which is transferred to the display control unit 322 to be displayed on the CRT 324.

(i) Image data I/O interface 326: This interface 326 receives image data supplied from the magnetic disk 301 and transfers picture data and linework data to the recording scanner 400.

The magnetic disk 301 stores linework data and picture data which have been previously prepared. FIG. 3(A) and FIG. 3(B) schematically show a one-page linework image, represented by complete one-page linework data, and a one-page picture image, represented by complete one-page picture data, respectively, before the overlapping process. FIG. 3(C) shows a composite image obtained by combining the linework data and the picture data. The images of FIGS. 3(A) and 3(B) correspond to the linework image and the picture image of FIG. 19(A), respectively. Namely, the linework data represents a one-page linework image having an effective linework area on one side of the boundary BLw, while the picture data represents a one-page picture image having an effective picture area on the other side of the boundary BLp corresponding to the boundary BLw in the linework.

The linework image of FIG. 3(A) includes a first tint area R1, a second area R2 where a picture image is to be pasted, and a third tint area R3. In other words, the first and third areas R1 and R3 are effective linework areas, and the second area R2 is a picture pasting area. Color numbers #1, #2, and

3 are allocated to the areas R1, R2, and R3, respectively. Although a linework image generally includes characters, logos, and illustrations, the linework image in this embodiment includes only the above three areas for the simplicity of explanation.

FIGS. 4(A) through 4(D) show an exemplified structure of linework data. As shown in FIG. 4(A), the linework data includes a linework-data management part, a color palette part, and a run-length data part. The linework-data management part includes a variety of data such as the size of the linework image, a resolution, and a file name.

The color palette part includes information for the respective four colors as shown in FIGS. 4(B) and 4(C), such as dot percents and picture priority flags Fy, Fm, Fc, and Fk. If the picture-priority flag is equal to one for some color, the picture data has priority over the linework data for that color. By contrast, the linework data has priority over the picture data for the colors whose picture-priority flag is equal to zero. The data of the color palette part are stored in the RAM 308 (FIG. 2) when the linework image data is read out from the magnetic disk 301 by the CPU 302.

FIG. 5 shows the relationship between the dot percents of the four colors and color numbers according to the color palette CP. For example, the color number #1 of the area R1 indicates the halftone dot area rate of 100% for cyan and 0% for the other three colors. The color provided with the symbol 'I' in FIG. 5 has the value '1' in the picture-priority flag (FIG. 4(C)). Namely, the color number #2, which is allocated to the area R2 shown in FIG. 3(A), indicates that the picture data has priority over the linework data in all four colors.

The run length data part of FIG. 4(A) includes run length data as shown in FIG. 4(D). A unit of run length data (hereinafter referred to as unit-run length data) includes a run length and a color number with respect to each run of the linework image. FIG. 4(D) shows the run length data along a scanning line L1 shown in FIG. 3(A), where the unit run-length data include respective run lengths and color numbers for the areas R1, R2, and R3. The run length data are stored in the linework memory 312.

FIGS. 6(A) and 6(B) show an exemplified structure of the picture data. FIG. 6(A) shows the picture data for one pixel including dot percents of Y, M, C, and K. FIG. 6(B) shows a pixel arrangement of the picture data on an image plane, where pixels are arranged in the order of scanning lines in a primary scanning direction Y. The picture data shown in FIG. 6(A) are stored in the order of this arrangement in the picture memory 314.

Figure 7:
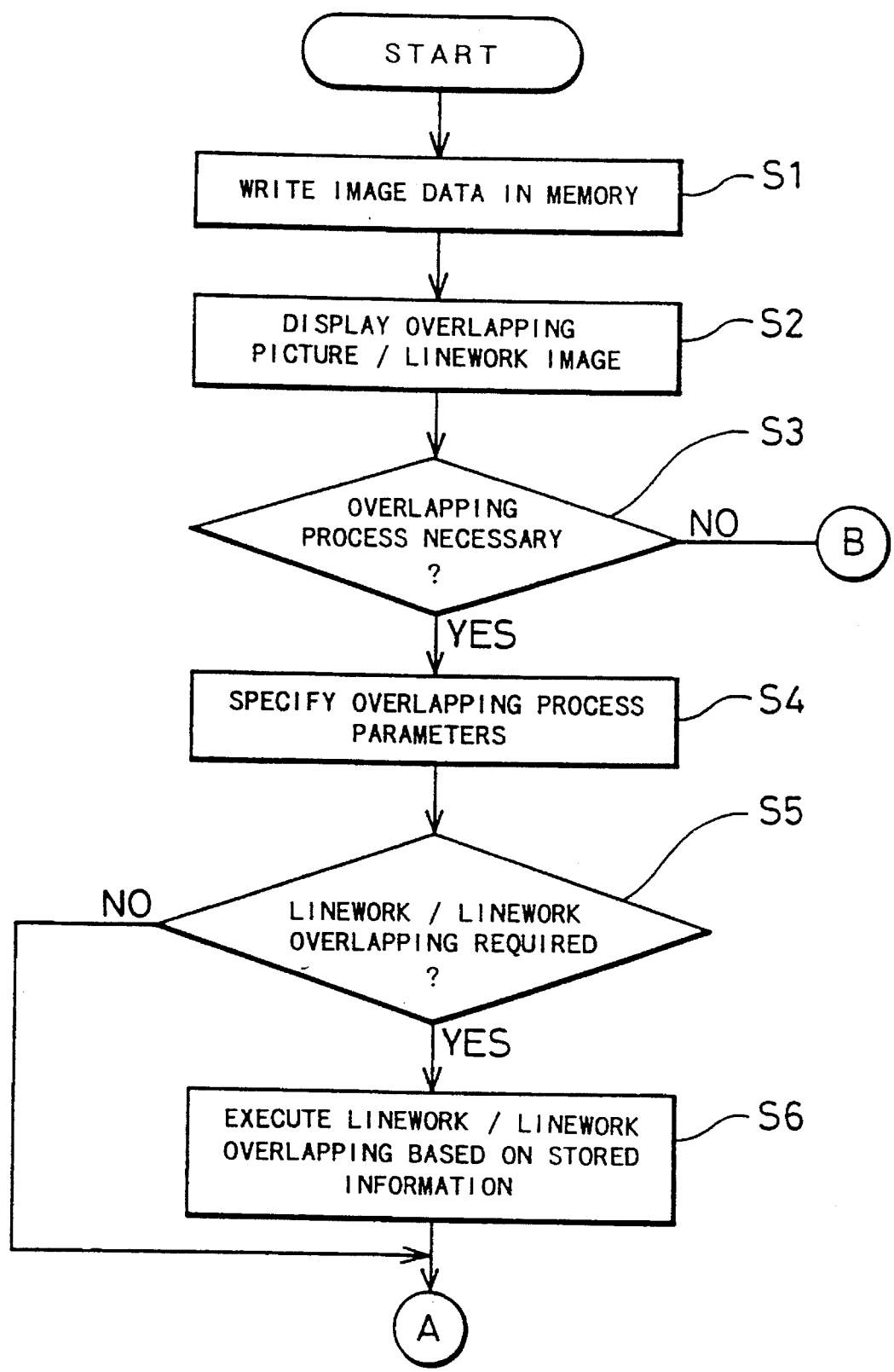
FIG. 7 is a flowchart showing steps of the overlapping process.
Figure 8:
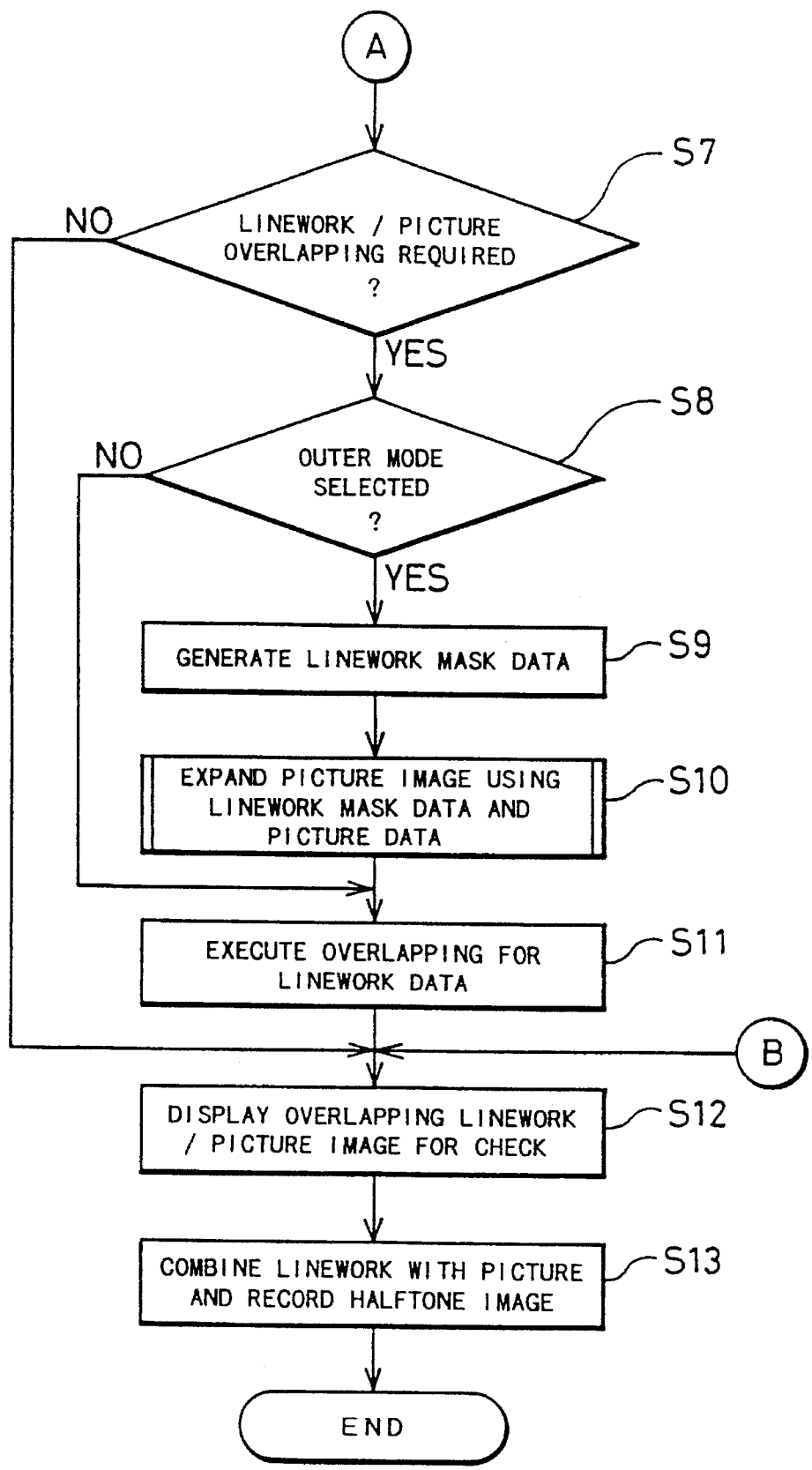
FIG. 8 is a flowchart showing additional steps of the overlapping process.

FIGS. 7 and 8 are flowcharts showing the steps of the overlapping process according to the present invention.

At step S1, linework data and picture data are read out of the magnetic disk 301 and written in the linework memory 312 and the picture memory 314, respectively. At step S2, a picture image and a linework image are displayed on the color CRT 324 while being overlapped as a function of the picture data stored in the picture memory 314 and the linework data stored in the linework memory 312.

At step S3, an operator inputs an instruction whether the overlapping process is to be performed or not. When the overlapping process is not required, the program proceeds to step S12, which will be described later. When the overlapping process is required, on the other hand, the program goes to step S4 at which parameters used in the overlapping process are specified by the operator, and the parameters are stored in the RAM 308.

FIG. 9(A) shows a composite image, and FIGS. 9 (B) through 9(D) show the overlapping-process parameters to generate the composite image shown in FIG. 9(A).

In FIG. 9(B), the overlapping process is executed on the boundary between two linework images. The overlapping-process parameters for this example include:

(1) Coordinates of points P11 and P12 defining a target image area for the overlapping process;

(2) Data instructions to perform the overlapping process on the boundary between two color numbers #11 and #12; and (3) Overlapping width (the number of pixels). The overlapping width represents a width of an overlapping image area produced through the overlapping process and is generally expressed in the unit of the number of pixels. For example, the overlapping width is specified as seven pixels at a resolution of 2,000 dpi (dot per inch).

In FIGS. 9(C) and 9(D), the overlapping process is performed on the boundary between a linework image and a picture image. The overlapping-process parameters of these examples include:

(1) Coordinates of points P21 and P22 (or P31 and P32) defining a target image area for the overlapping process;

(2) Overlapping-process mode (outer mode or inner mode);

(3) Overlapping width (the number of pixels); and (4) Exempt colors for the overlapping process.

The overlapping-process mode indicates a direction of the overlapping process from the boundary between the linework image and the picture image, and it includes two modes: an outer mode and an inner mode.

In the outer mode, an overlapping image area is produced on the side of the linework image from the boundary. The outer mode is preferably applied when a density of the picture image on the boundary is lower than that of the linework image.

In the inner mode, an overlapping image area is produced on the side of the picture image. The inner mode is preferably applied when a density of the linework image on the boundary is lower than that of the picture image.

The density of the exempt color in the linework image is maintained intact in the overlapping image area. On the other hand, for the primary colors other than the exempt color, the density of the picture image has priority over that of the linework image in producing the overlapping image area. The image processing unit 300 executes steps S5 through S12 in the flowcharts of FIGS. 7 and 8 according to the overlapping-process parameters specified at step S4, based on the programs stored in the ROM 306 and data stored in the RAM 308.

At step S5, it is determined whether a linework/linework overlapping process is required. When the answer is NO at step S5, the program goes to step S7. On the other hand, when the answer is YES at step S5, the program proceeds to step S6 at which an overlapping image area is produced on a boundary between two linework images. A preferable method of producing an overlapping image area on a boundary between two linework images is described in a commonly owned pending U.S. patent application Ser. No. 07/788,211, allowed, the disclosure of which is incorporated herein by reference.

At step S7 of FIG. 8, it is determined whether a picture/linework overlapping process is required. When the answer is NO at step S7, the program proceeds to step S12, at which a composite image obtained by laying a linework image and a picture image one upon the other is re-displayed on the CRT 324. However, when the answer is YES at step S7 the program goes to steps S8 through S11 for executing the picture/linework overlapping process described below.

At step S8, it is determined whether the outer mode is selected. When the outer mode is selected for at least one portion of the one-page composite image, the program goes to steps S9 and S10 for expanding a picture image. In the outer mode, an overlapping image area with a predetermined overlapping width is produced on the side of the linework image from the boundary between the linework image and the picture image. Actually, at steps S9 and S10, an effective picture area of the picture image is expanded to prevent a blank portion DA (shown in FIG. 19(B)) in a final composite image after the overlapping process.

Figure 10A:
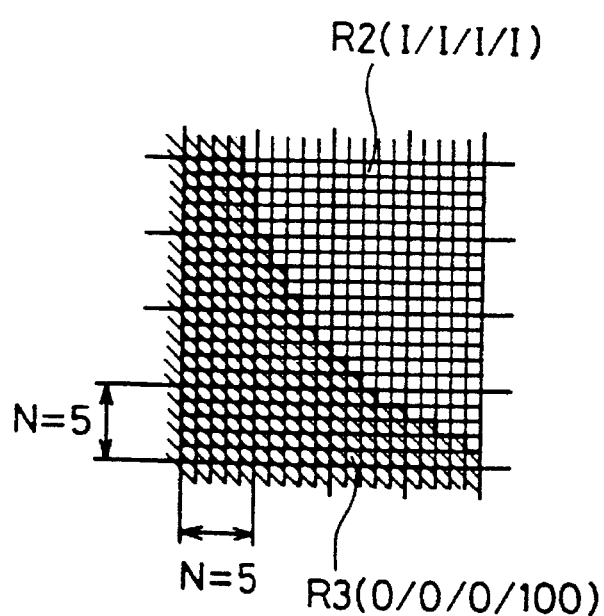
FIGS. 10(A) and 10(B) show a selective skipping process.
Figure 10B:
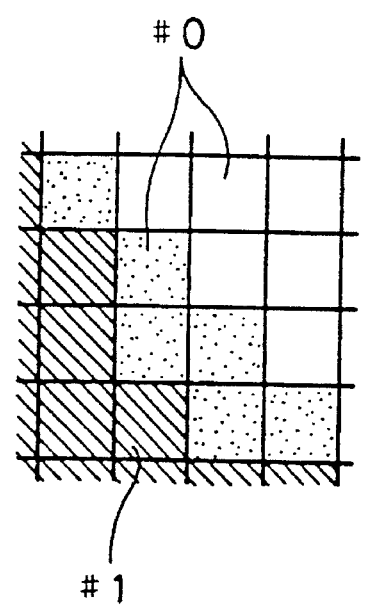

At step S9, selective skipping is executed on linework data with respect to the picture priority flags Fk, Fc, Fm, and Fy (FIG. 4(C)) to reduce the linework image by 1/N, where N is a predetermined integer, thereby generating mask linework data. FIGS. 10(A) and 10(B) show linework image areas before and after the selective skipping. In FIG. 10(A), a shaded portion corresponds to the area R3 of the linework image shown in FIG. 3(A) whereas the other portion corresponds to the area R2 of the picture image.

The selective skipping is one of the skipping methods for substituting each NxN pixel block with a representative pixel, thereby producing a reduced image representing the original image. If there is at least one pixel whose picture-priority flag is one in an NxN pixel block, the color number #0 is allocated to the representative pixel for the pixel block. On the other hand, when there is no pixel whose picture-priority flag is one in the pixel block, the color number #1 is allocated to the representative pixel for the pixel block. In the example of FIGS. 10(A) and 10(B), the skipping ratio N is set equal to five, which is equal to the ratio of the resolution of the linework image to that of the picture image In FIG. 10(B), the pixels filled with fine dots are the representative pixels corresponding to the pixel blocks in FIG. 10(A) where the pixels with the value '1' and with the value '0' as the picture-priority flags are mixed. The color number #0 is also allocated to these representative pixels.

FIGS. 11(A) through 11(D) show the process of expanding a picture image. FIG. 11(A) shows an original linework image, and FIG. 11(B) shows a mask linework image represented by mask linework data obtained by the selective skipping. The dimensions of the mask linework image Wx/N and Wy/N expressed by the number of pixels are respectively 1/N of the dimensions of the original linework image Wx and Wy. The mask linework data generated in the above manner are stored in the linework memory 312.

The method of selective skipping is described in a commonly owned pending U.S. patent application Ser. No. 08/047,158, which is a continuation application of Ser. No. 07/765,585, abandoned, the disclosure of which is incorporated herein by reference.

The mask linework image shown in FIG. 11(B) thus obtained has a boundary BLp identical with that of the picture image shown in FIG. 11(C). Since the picture data only indicates dot percents of four color components for each pixel, the boundary BLp of the picture image is not directly obtained from the picture data. The purpose of generating the mask linework image is therefore to obtain the boundary BLp of the picture image.

Alternatively, the mask linework image can be obtained if the pixels in the background area of the picture image are allocated with halftone dot area rates of 100% for all four color component. In this case, the mask linework image is obtained by following the boundary of the pixels whose halftone dot area rates are 100% for all the color components.

At step S10, the expansion processing is executed, whereby an effective picture area of a picture image is expanded by a predetermined width based on the mask linework data and the picture data. FIG. 11(D) shows a resultant image obtained by the expansion process.

Figure 12:
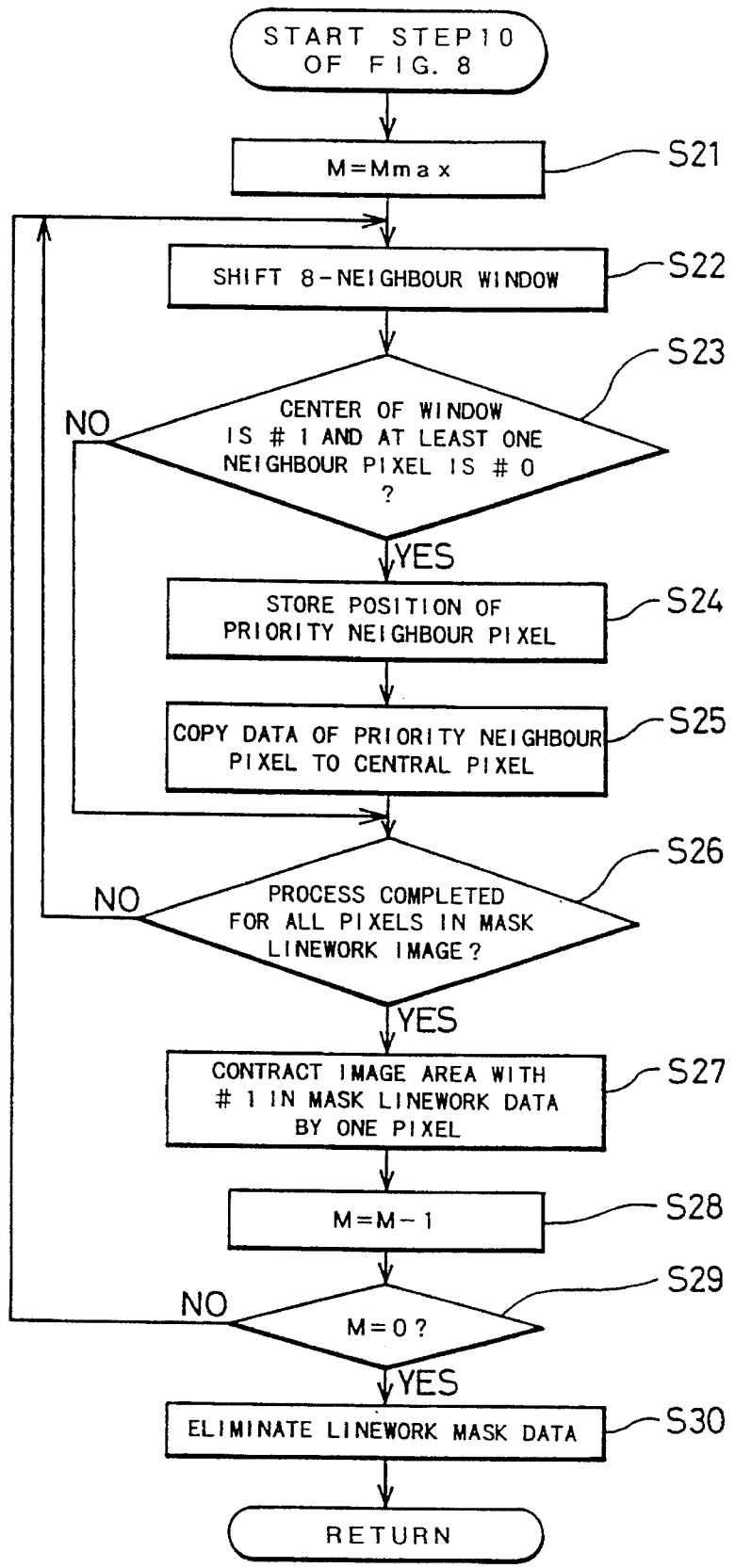
FIG. 12 is a flowchart showing the process of expanding a picture image.

FIG. 12 is a flowchart showing the details of the expansion process executed at step S10. At step S21, a parameter M indicating an expansion width is set equal to Mmax. Mmax is a maximum expansion width expressed in the unit of the number of picture pixels, and no less than the overlapping width. The expansion width Mmax is determined by dividing the overlapping width, which is expressed in the unit of the number of pixels of the linework image, by the resolution ratio N (=5), and by raising a decimal fraction to a whole number. For example, when the overlapping width is seven pixels, seven is divided by five, and the decimal fraction of the result of 1.4 is raised to the whole number, whereby the expansion width Mmax is obtained to be two.

At step S22, an eight-neighbor window EW shown in FIG. 13(A) is shifted simultaneously on the mask linework image of FIG. 11(B) and on the picture image of FIG. 11(C). The eight-neighbor window EW includes eight neighbor pixels surrounding a central pixel CP. The neighbor pixels are allocated with priority numbers 1 through 8, where the lower the priority number, the higher the priority becomes.

If the following two conditions are satisfied on the mask linework image at step S23, the program goes to step S24:

Condition 1): The central pixel CP has the color number #1; and

Condition 2): At least one of the neighbor pixels has the color number #0.

At a location where the two conditions are fulfilled, the central pixel CP of the eight-neighbor window EW is positioned just outside the boundary BLp of the picture image as shown in FIG. 13(B). The expansion process of the picture image is then executed at steps S24 and S25 at such a location. At step S24, a priority neighbor pixel is found which has the highest priority among the neighbor pixels whose color number is #0, and the location of the priority neighbor pixel is memorized. In FIG. 13(B), the neighbor pixels with the priority numbers 2, 4, and 8 have the color number #0. In this case, the priority neighbor pixel is the neighbor pixel having the priority number of 2. At step S25, the picture image data at the location of the priority neighbor pixel is copied to the location of the central pixel CP as shown in FIG. 13(C). As a result, the picture image area is expanded outward from the boundary BLp.

If at least one of the above two conditions is not fulfilled at step S23, the programs skips steps S24 and S25 and goes to step S26, at which it is judged whether the above process using the eight-neighbor window EW is completed for all the pixels in the mask linework image. When the answer is NO, the program returns to step S22, at which the eight-neighbor window is shifted by one pixel, and the processing of steps S23 through S25 is repeated.

The picture image is expanded by one pixel along the entirety of the boundary BLp by repeating steps S22 through S26 for all the pixels in the picture image. The program then goes to step S27, at which the area whose color number is #1 in the mask linework data is contracted by one pixel using the eight-neighbor window EW. Contracting the #1 area is equivalent to spreading the #0 area. Step S27 is the preparation for the next routine of the expansion process at steps S22 through S26. This contraction process is a known technique and therefore is not described in detail here.

At step S28, the parameter M is decreased by one.

At a subsequent step S29, it is judged whether the parameter M is equal to zero or not. When the parameter M is not equal to zero, the program returns to step S22 to repeat the expansion process described above. Namely, steps S22 through S28 are repeated until the parameter M becomes equal to zero, which results in completion of the expansion by Mmax pixels.

After completion of expanding the picture image, the program goes to step S30, at which the mask linework data is eliminated.

When the process of step S10 shown in FIG. 12 is completed, the program goes to step S11 of FIG. 8, at which the overlapping processing is executed on the linework data to produce an overlapping image area according to the mode and parameters specified for the linework data at step S4.

FIGS. 14(A) through 14(C) illustrate the results of the two modes of the overlapping process. In the outer mode shown in FIG. 14(B), the picture image area R2 in the linework image is expanded by the predetermined overlapping width. On the other hand, in the inner mode shown in FIG. 14(C) the picture image area R2 is contracted by the predetermined overlapping width. The expansion and contraction process steps are executed using a eight-neighbor window including eight neighbor pixels or a four-neighbor window including four neighbor pixels.

In the image of FIG. 14(B), a new boundary BR2 drawn by the broken line is obtained by expanding an original boundary BR1 drawn by the solid line, towards the inside of the linework image areas R1 and R3. Accordingly, new image areas R4 and R5 are generated between the original boundary BR1 and the new boundary BR2. These new image areas R4 and R5 are used as the overlapping image areas.

Figure 15A:
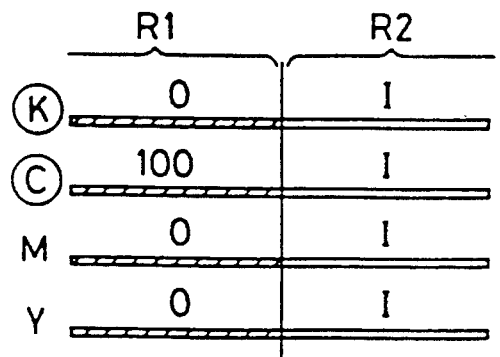
Figure 15B:
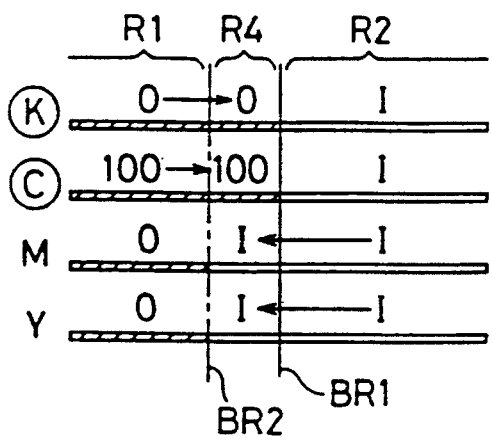
Figure 15C:
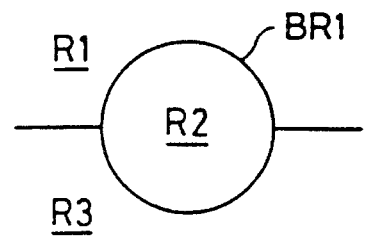
Figure 15D:
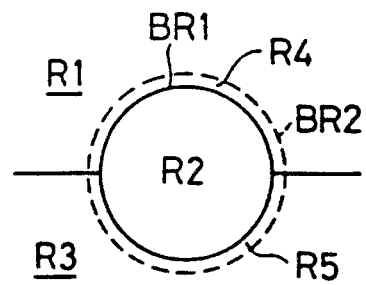

FIGS. 15(A) through 15(E) show the method of determining color data of the overlapping image areas R4 and R5 in the outer mode. FIG. 15(A) shows the color data around the boundary BR1 before the expansion of the picture image area R2, and FIG. 15(C) is a plan view of an image portion corresponding to FIG. 15(A). FIG. 15(B) shows the color data of the overlapping image area R4 and those of the image areas R1 and R2, and FIG. 15(D) is a plan view of an image portion corresponding to FIG. 15(B). As shown in FIG. 15(B), the color data of Y/M/C/K in the overlapping image area R4 are equal to I/I/100/0, where the character 'I' represents the picture-priority flag of 1. In this example, cyan (C) and black (K) are specified as the exempt colors of the overlapping process. The dot percents of the C and K components in the linework image area R1 and R3 are thereby unchanged by the overlapping process and maintained in the overlapping image area R4. This is also the case with the overlapping image area R5. The color components of Y (yellow) and M (magenta), which are specified as the target colors of the overlapping process, have the picture-priority flag 'I' in the overlapping image areas R4 and R5, where the picture data has priority over the linework data. FIG. 15(E) shows the color palette CP including color numbers #4 and #5 allocated to the overlapping image areas R4 and R5.

As clearly seen in FIG. 15(B), the actual boundary for the exempt color components of C and K is the original boundary BR1. Those edges of the linework image areas R1 and R2 of the original linework image, which edges are defined at a high resolution, are thus maintained for the exempt colors C and K. For the target color components Y and M for the overlapping process, on the other hand, the actual boundary is the new boundary BR2. Since the picture data has priority over the linework data in the overlapping image areas R4 and R5, the linework image and the picture image overlap in the overlapping image areas R4 and R5.

No more than three colors out of the four primary colors Y, M, C, and K are specified as the exempt colors for the overlapping process. A conspicuous color component having a greater density in the image areas R1 and R2 adjacent to the original boundary BR1 is preferably selected as the exempt color. This maintains the edge of the conspicuous color component at the high resolution.

In this embodiment, an overlapping image area is produced only on a boundary between an area whose four picture-priority flags are all "1" and another area whose four picture-priority flags are all "0", such as the case shown in FIGS. 14(A) and 15(A). This is because the area in which the values of the picture-priority flags include both "1" and "0" is an overlapping image area produced by the overlapping process previously executed.

In the image of FIG. 14(C), a new boundary BR12 drawn by the broken line is obtained by contracting an original boundary BR11 drawn by the solid line towards the inside of a picture image area R12. Overlapping image areas R14 and R15 are thus generated between the original boundary BR11 and the new boundary BR12.

Figure 16:
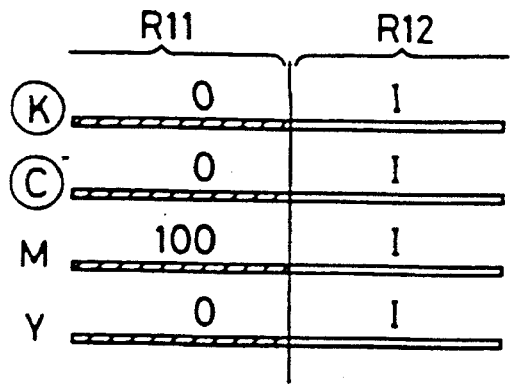
FIGS. 16(A) through 16(E) show a method of determining color data of overlapping image areas in the inner mode of FIGS. 14(A)–(C)
Figure 16:
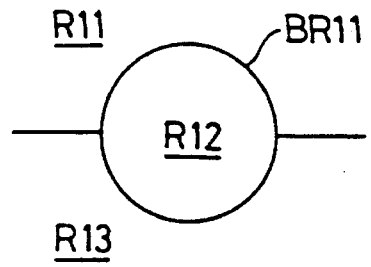
Figure 16:
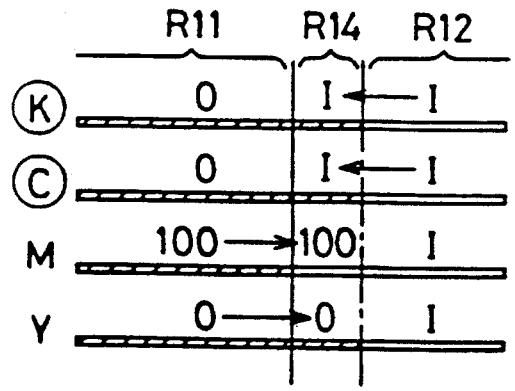
Figure 16:
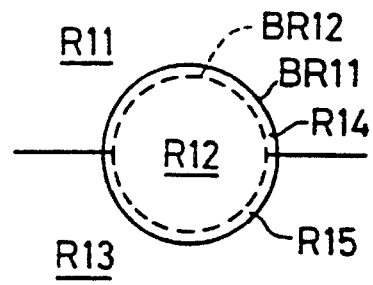

FIGS. 16(A) through 16(E) show the method of determining color data of the overlapping image areas R14 and R15 in the inner mode. FIG. 16(A) shows the color data around the boundary BR11 before the contraction of the picture image area R12, and FIG. 16(C) is a plan view of an image portion corresponding to FIG. 16(A). FIG. 16(B) shows the color data of the overlapping image area R14, and FIG. 16(D) is a plan view of an image portion corresponding to FIG. 16(B). As shown in FIG. 16(B), the color data of Y/M/C/K in the overlapping image area R14 are equal to 0/100/I/I, respectively, where the character 'I' represents the picture-priority flag of "1". In this example, cyan (C) and black (K) are specified as the exempt colors for the overlapping process, as is the case with the outer mode shown in FIGS. 15(A) through 15(E). FIG. 16(E) shows the color palette CP including color numbers #14 and #15 allocated to the overlapping image areas R14 and R15.

In the inner mode, the high-resolution edges of the linework image areas R11 and R13 are maintained for the exempt colors, as is the case with the outer mode. The exempt color is preferably selected to be the color which has a relatively high density in the picture image area R12 at the original boundary BR11 and which is conspicuous accordingly.

After the overlapping process is completed for the linework image, the program goes to step S12 of FIG. 8, at which the processed linework image and picture image are displayed on the color CRT 324 while overlapping with each other. Here the operator can check whether the composite image displayed on the CRT 324 is satisfactory. If the composite image is satisfactory, the processed linework data and picture data are transferred to the recording scanner 400 at step S13.

The recording scanner 400 combines the linework data with the picture data to generate halftone images of the final composite image. The halftone images are the color separation images of the final composite image including the overlapping image areas, and they are generally produced for the four primary colors of Y, M, C, and K. If some correction is required on the composite image displayed on the color CRT 324 at step S12, the required processing such as the overlapping or retouching may be executed before step S13.

Figure 17:
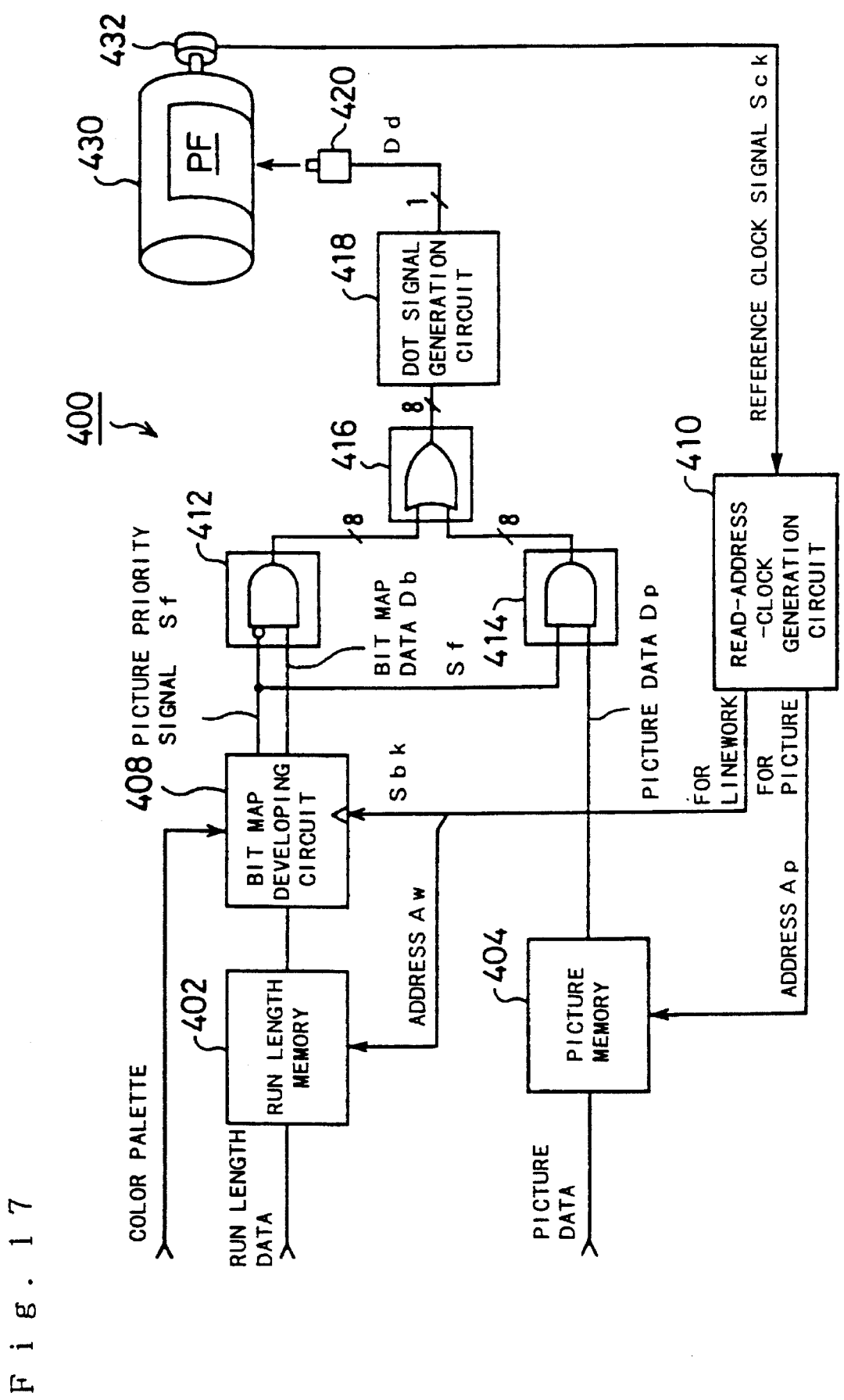
FIG. 17 is a block diagram schematically showing an internal structure of the recording scanner 400 of FIG. 1.

FIG. 17 is a block diagram showing the structure of the recording scanner 400. Run length data supplied to the recording scanner 400 is memorized in a run length memory 402, and picture data is stored in a picture memory 404.

An encoder 432 connected to a recording drum 430 outputs a reference clock signal Sck synchronized with a rotation of the recording drum 430 to a read-address-clock generation circuit 410. The read-address-clock generation circuit 410 outputs a clock signal Sbk to a bit map developing circuit 408, a linework reading address Aw to the run length memory 402, and a picture reading address Ap to the picture memory 404.

As shown in FIGS. 19(A) and 19(B) discussed before, the size of a linework pixel Pw is one fifth of that of a picture pixel Pp. In other words, the resolution of the linework image is five times higher than that of the picture image. The picture data is read out of the picture memory 404 at a resolution identical with that of the linework data. This means that picture data representing one scanning line of a picture pixel are read out of the picture memory 404 while the run length data representing five scanning lines of a linework pixel are read out of the run length memory 402. Moreover, while the run length data for five linework pixels on one scanning line are converted into bit map data by the bit map developing circuit 408, the picture data for one picture pixel is repeatedly read out of the picture memory 404 five times. In this manner, the picture data for one picture pixel is read twenty-five times in synchronism with the developing of the linework data for 5×5 linework pixels.

The bit map developing circuit 408 converts the run length data to bit map data for each linework pixel while referring to the color palette. The linework data after the bit map developing has the structure similar to that of the picture data shown in FIGS. 6(A) and 6(B). The bit map developing circuit 408 outputs a picture priority signal Sf as well as the bit map data Db. The 10 picture priority signal Sf represents the picture priority flags Fy, Fm, Fc, and Fk shown in FIG. 4(C).

The picture priority signal Sf is inverted to be input into a first AND gate unit 412, which also receives the bit map data Db. The first AND gate unit 412 includes a plurality of AND gates, the number of which corresponds to the number of bits (=8) of the bit map data Db for one color component. In FIG. 17, however, only one AND gate is shown for clarity of illustration. When the picture priority signal Sf has the higher level '1', that is, when the picture data has priority over the linework data, the output of the first AND gate unit 412 is equal to zero. On the other hand, when the picture priority signal Sf has the lower level '0', the output of the first AND gate unit 412 is equal to the bit map data Db.

A second AND gate unit 414 receives the picture priority signal Sf and the picture data Dp. When the picture priority signal Sf has the higher level '1', the output of the second AND gate unit 414 is equal to the picture data Dp. On the other hand, when the picture priority signal Sf has the lower level '0', the output of the second AND gate unit 414 is equal to zero.

The outputs from both of the first and the second AND gate units 412 and 414 are supplied to an OR gate unit 416. Actually, the OR gate unit 416 receives the bit map data Db of the linework image or the picture data Dp according to the level of the picture priority signal Sf. The output of the OR gate unit 416 is then transferred to a dot signal generation circuit 418 for generating a dot signal Dd indicating whether or not to expose each pixel. An exposure head 420 emits a modulated laser beam in response to the dot signal Dd, thereby recording a halftone image on a photosensitive film PF mounted on the recording drum 430, which is rotating at a constant speed during the recording.

Incidentally, the linework data and the picture data can be combined with each other according to the method and the apparatus disclosed in U.S. Pat. Nos. 4,553,172, 4,626,902, and 4,628,366, the disclosure of which is incorporated herein by reference.

In the above embodiment, since an effective picture image area is expanded in the outer mode of the overlapping process while an effective linework image area is contracted, executing the overlapping process in the outer mode on the completed picture data does not cause undesirable blank portions surrounding the picture image. This allows execution of the overlapping process on a one-page picture data and a one-page linework data, both of which are previously prepared without the overlapping process.

The mask linework image shown in FIG. 11(B) has the same size as the picture image shown in FIG. 11(C) when measuring the size in terms of the same number of pixels, and includes the information indicating the boundary in the picture image. With the mask linework image, the picture image can be easily expanded.

Since the expansion width of the picture image is set so as to be no less than the overlapping width, no blank portions, such as shown in FIG. 19(B), are produced through the overlapping process.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of processing linework data representing a one-page color linework image and picture data representing a one-page color picture image to produce a one-page composite image where said linework image and said picture image overlap at least partly with each other, said method comprising the steps of:

(a) preparing linework data representing a one-page color linework image at a first resolution, said one-page color linework image having an effective linework area on one side of a first boundary and a picture pasting area on the other side of said first boundary, wherein a picture image has priority over a linework image in said picture pasting area;

(b) preparing picture data representing a one-page color picture image at a second resolution lower than said first resolution, said one-page color picture image having an effective picture area on one side of a second boundary, said second boundary corresponding to said first boundary, said effective picture area corresponding to said picture pasting area in said one-page color linework image;

(c) correcting said picture data to expand said effective picture area by a predetermined first width;

(d) correcting said linework data to expand said picture pasting area by a predetermined second width; and (e) recording a plurality of halftone images of a one-page color composite image of said linework image and said picture image as a function of said corrected picture data and said corrected linework data.

2. A method in accordance with claim 1, further comprising the step of:

(f) preparing mask image data representing a mask image, said mask image data providing said second boundary in said one-page picture image at said second resolution; and wherein said step (c) comprises the steps of:

(c-1) comparing said mask image data and said picture data to find density of a plurality of color components on said one side of said second boundary; and (c-2) correcting said picture data by copying said density of said plurality of color components of a first picture pixel on said one side of said second boundary to a second picture pixel on the other side of said second boundary along the entirety of said second boundary such that said effective picture area is expanded.

3. A method in accordance with claim 2, wherein said step (c) further comprises the steps of:

(c-3) correcting said mask image data such that said second boundary is expanded by the same amount as said expansion of said effective picture area at said step (c-2); and (c-4) repeating said steps (c-1) through (c-3) to expand said effective picture area by said first width.

4. A method in accordance with claim 3, wherein said step (f) comprises the step of:

(f-1) reducing said linework data from said first resolution to said second resolution to produce said mask image data.

5. A method in accordance with claim 2, wherein said mask image data has a first color number at each pixel on said one side of said second boundary corresponding to said effective picture area in said one-page color picture image, and a second color number at each pixel on the other side of said second boundary; and said step (c-1) comprises the steps of:

virtually moving a window on said mask image one pixel at a time and simultaneously on said one-page color picture image, said window having a central pixel and eight neighbor pixels surrounding said central pixel;

finding a pixel in said mask image where said first color number is allocated to said central pixel and said second color number is allocated to at least one of said eight neighbor pixels; and copying said density of said plurality of color components of said first picture pixel to said second picture pixel, wherein said first picture pixel corresponds to said one of said eight neighbor pixels to which said second color number is allocated, and wherein said second picture pixel corresponds to said central pixel of said window.

6. A method in accordance with claim 2, further comprising the step of:

selecting at least one target color component out of said plurality of color components; and wherein said step (d) comprises the step of:

(d-1) correcting said target color component of said linework data such that said target color component of said effective linework image area remains intact in an overlapping area which is covered by said expanded picture pasting area.

7. A method in accordance with claim 1, wherein said first width is no less than said second width.

8. A method of processing linework data representing a one-page color linework image and picture data representing a one-page color picture image to produce a one-page composite image wherein said linework image and said picture image overlap at least partly with each other, said method comprising the steps of:

(a) preparing linework data representing a one-page color linework image at a first resolution, said one-page linework image having an effective linework area on a first side of a first boundary, said linework data including image-representation data indicating a plurality of color components at each linework pixel in said linework image, said linework data further including priority data indicating which of a picture image and said linework image has priority at each pixel of said linework image;

(b) preparing picture data representing a one-page color picture image at a second resolution lower than said first resolution, said one-page color picture image having an effective picture area on a first side of a second boundary, said second boundary corresponding to said first boundary, said first side of said second boundary corresponding to a second side of said first boundary, said picture data including said plurality of color components at each picture pixel in said one-page color picture image;

(c) selecting one of a first overlapping direction and a second overlapping direction, said first overlapping direction indicating that an overlapping image area is produced in said effective linework area, said second overlapping direction indicating that said overlapping image area is produced in said effective picture area, and selecting at least one target color component out of said plurality of color components;

(d) correcting said picture data to expand said effective picture area by a predetermined first width when said first overlapping direction is selected at said step (c);

(e) correcting said image-representation data of said linework data to produce an overlapping image area of a predetermined second width at said first resolution, said overlapping image area extending from said first boundary in said overlapping direction selected in said step (c);

(f) updating said priority data such that said linework image has priority over said picture image for said target color component in said overlapping image area while said picture image has priority over said linework image for the other color components other than said target color component in said overlapping image area; and (g) combining said image-representation data with said picture data at a predetermined resolution no less than said first resolution while referring to said priority data updated in said step (f), to thereby record a plurality of halftone images of a one-page color composite image.

9. An apparatus for processing linework data representing a one-page color linework image and picture data representing a one-page color picture image to produce a one-page composite image where said linework image and said picture image overlap at least partly with each other, said apparatus comprising:

a first memory for memorizing linework data representing a one-page color linework image at a first resolution, said one-page color linework image having an effective linework area on one side of a first boundary and a picture pasting area on the other side of said first boundary, wherein a picture image has priority over a linework image in said picture pasting area;

a second memory for memorizing picture data representing a one-page color picture image at a second resolution lower than said first resolution, said one-page color picture image having an effective picture area on one side of a second boundary, said second boundary corresponding to said first boundary, said effective picture area corresponding to said picture pasting area in said one-page color linework image;

first correcting means for correcting said picture data to expand said effective picture area by a predetermined first width;

second correcting means for correcting said linework data to expand said picture pasting area by a predetermined second width; and recording scanner for recording a plurality of halftone images of a one-page color composite image as a function of said corrected picture data and said corrected linework data.

10. An apparatus in accordance with claim 9, further comprising:

a third memory for memorizing mask image data representing a mask image, said mask image data providing said second boundary in said one-page picture image at said second resolution; and wherein said first correcting means comprises:
first means for comparing said mask image data and said picture data to find density of a plurality of color components on said one side of said second boundary; and
second means for correcting said picture data by copying said density of said plurality of color components of a first picture pixel on said one side of said second boundary to a second picture pixel on the other side of said second boundary along the entirety of said second boundary such that said effective picture area is expanded.

11. An apparatus in accordance with claim 10, wherein said first correcting means further comprises:
third means for correcting said mask image data such that said second boundary is expanded by the same amount as said expansion of said effective picture area by said second means.

12. An apparatus in accordance with claim 11, further comprising means for reducing said linework data from said first resolution to said second resolution to produce said mask image data.

13. An apparatus in accordance with claim 10, wherein said mask image data has a first color number at each pixel on said one side of said second boundary corresponding to said effective picture area in said one-page color picture image, and a second color number at each pixel on the other side of said second boundary; and said first means comprises:
means for virtually moving a window on said mask image one pixel at a time and simultaneously on said one-page color picture image, said window having a central pixel and eight neighbor pixels surrounding said central pixel;
means for finding a pixel in said mask image where said first color number is allocated to said central pixel and said second color number is allocated to at least one of said eight neighbor pixels; and
means for copying said density of said plurality of color components of said first picture pixel to said second picture pixel, wherein said first picture pixel corresponds to said one of said eight neighbor pixels to which said second color number is allocated, and wherein said second picture pixel corresponds to said central pixel of said window.

14. An apparatus in accordance with claim 10, further comprising:

means for selecting at least one target color component out of said plurality of color components; and wherein said second correcting means comprises:
means for correcting said target color component of said linework data such that said target color component of said effective linework image area remains intact in an overlapping area which is covered by said expanded picture pasting area.

15. An apparatus in accordance with claim 9, wherein said first width is no less than said second width.

* * * * *